(12) United States Patent
Martin et al.

(10) Patent No.: US 8,794,637 B2
(45) Date of Patent: *Aug. 5, 2014

(54) SEAL

(75) Inventors: David Martin, Inveruruie (GB); Ewan Sinclair, Aberdeen (GB)

(73) Assignee: Freudenberg Oil & Gas UK Limited (GB)

(*) Notice: Subject to any disclaimer, the term of this patent is extended or adjusted under 35 U.S.C. 154(b) by 0 days.

This patent is subject to a terminal disclaimer.

(21) Appl. No.: 13/481,201

(22) Filed: May 25, 2012

(65) Prior Publication Data

US 2012/0312556 A1    Dec. 13, 2012

Related U.S. Application Data

(63) Continuation of application No. 11/307,921, filed on Feb. 28, 2006, now Pat. No. 8,186,685, which is a continuation of application No. PCT/GB2004/003631, filed on Aug. 26, 2004.

(30) Foreign Application Priority Data

Aug. 29, 2003   (GB) .................................. 0320252.0

(51) Int. Cl.
| | |
|---|---|
| F16L 5/02 | (2006.01) |
| F16L 17/00 | (2006.01) |
| F16L 21/02 | (2006.01) |
| F16L 33/16 | (2006.01) |
| H02G 3/22 | (2006.01) |
| H02G 15/013 | (2006.01) |
| F16J 3/00 | (2006.01) |
| F16J 15/52 | (2006.01) |
| F16J 15/46 | (2006.01) |
| F16J 15/08 | (2006.01) |
| F16J 15/10 | (2006.01) |

(52) U.S. Cl.
USPC .......... 277/605; 277/607; 277/636; 277/645; 277/652

(58) Field of Classification Search
USPC ......... 277/334, 336–341, 605, 607, 645, 636, 277/652; 166/196, 387
See application file for complete search history.

(56) References Cited

U.S. PATENT DOCUMENTS

| | | | |
|---|---|---|---|
| 1,136,879 A | | 4/1915 | Hunt |
| 2,119,252 A | * | 5/1938 | Thaheld .......................... 92/182 |

(Continued)

FOREIGN PATENT DOCUMENTS

| | | |
|---|---|---|
| DE | 1099892 | 5/2001 |
| EP | 1099892 | 5/2001 |
| FR | 1095569 | 6/1955 |

*Primary Examiner* — Kristina Fulton
*Assistant Examiner* — Nicholas L Foster
(74) *Attorney, Agent, or Firm* — Daniel N. Lundeen; Lundeen & Lundeen PLLC

(57) ABSTRACT

An annular sealing element to seal between metal surfaces for use in flanges, joints, packers and the like, located in oil and gas exploration and production equipment. The sealing element has inner and outer metal deformable surfaces joined at ends, defining an interior volume which is entirely filled with a plastic deformable material. The surfaces are arranged such that on compression of the element from the ends, the element will deform in a controlled manner on a cantilever principle. The volume of filler and the interior volume remain substantially equal during compression so that delamination does not occur. Thus the sealing element provides a seal combining the flexibility of elastomer seals with the integrity of a metal to metal seal.

14 Claims, 5 Drawing Sheets

(56) References Cited

U.S. PATENT DOCUMENTS

| | | | |
|---|---|---|---|
| 2,125,665 A * | 8/1938 | Bettis | 166/196 |
| 3,147,016 A * | 9/1964 | Traufler | 277/605 |
| 3,163,431 A * | 12/1964 | Tanner | 277/381 |
| 3,235,017 A | 2/1966 | Lynes | |
| 3,275,335 A * | 9/1966 | Johnson et al. | 277/639 |
| 3,392,785 A | 7/1968 | King | |
| 3,490,777 A | 1/1970 | Emmerson | |
| 3,776,561 A | 12/1973 | Haney | |
| 4,452,462 A * | 6/1984 | Karr, Jr. | 285/112 |
| 4,482,086 A * | 11/1984 | Wagner et al. | 277/337 |
| 4,862,967 A * | 9/1989 | Harris | 166/387 |
| 4,869,319 A * | 9/1989 | Szymozak et al. | 166/115 |
| 5,199,497 A | 4/1993 | Ross | |
| 5,240,263 A | 8/1993 | Nicholson | |
| 5,669,612 A | 9/1997 | Nicholson | |
| 5,775,429 A * | 7/1998 | Arizmendi et al. | 166/387 |
| 5,941,313 A * | 8/1999 | Arizmendi | 166/387 |
| 5,961,123 A * | 10/1999 | Ingram et al. | 277/311 |
| 5,988,276 A * | 11/1999 | Oneal | 166/118 |
| 6,009,951 A | 1/2000 | Coronado et al. | |
| 6,039,319 A * | 3/2000 | Coonce et al. | 277/314 |
| 6,142,227 A | 11/2000 | Hiorth et al. | |
| 6,322,087 B1 * | 11/2001 | Swensen et al. | 277/626 |
| 6,446,717 B1 * | 9/2002 | White et al. | 166/187 |
| 6,637,750 B2 * | 10/2003 | Quoiani | 277/339 |
| 7,216,706 B2 | 5/2007 | Echols et al. | |
| 8,186,685 B2 * | 5/2012 | Martin et al. | 277/340 |
| 2002/0166672 A1 * | 11/2002 | White et al. | 166/387 |

* cited by examiner

SEAL

CROSS REFERENCE TO RELATED APPLICATIONS

This application is a continuation of U.S. Ser. No. 11/307,921, filed Feb. 28, 2006, now U.S. Pat. No. 8,186,685, which is the subject of reissue application U.S. Ser. No. 13/597,198, filed Aug. 28, 2012, and which is a continuation of international application PCT/GB2004/003631, filed Aug. 26, 2004, which are hereby incorporated herein by reference in their entireties.

BACKGROUND

The present invention relates to seals used between metal surfaces and in particular, though not exclusively, to an annular seal for use in flanges, joints and packers located in oil and gas exploration and production equipment.

Typical annular seals used to prevent the passage of fluid between two surfaces are elastomeric o-rings. The material makes them flexible enough to mould into any deformities in the metal surface, while their compressibility aids in providing a large sealing area. However, these seals can go beyond their operational limits when used within well bores during oil and gas exploration and production, due to the extremes of pressure, temperature and the harsh substances which are used. In order to overcome these problems, metal to metal seals have been developed to provide increased seal strength and reduce seal degradation.

These metal to metal seals have found application in flanges, for example. When API 6A or similar flanges are manufactured, the groove has an exact geometry and surface finish. The sealing ring is a solid metal ring, which is compressed against the seal ring grooves to make the metal-to-metal seal. This is typically achieved by tightening the bolts on the flange. As there is no or little flexibility in the seal, side loading can reduce or remove any seal formed between the groove and flange. Furthermore, older flanges, which are subject to corrosion, can leak. As there is no compliance within the solid metal ring, once a leak appears the seal cannot be re-seated without re-tightening the bolts. In sub-seal applications, it is very expensive to monitor each flange and tighten the bolts as part of a maintenance programme.

To overcome this problem, seals incorporating the strength of metals together with the flexible characteristics of elastomers have been developed. EP 1136734, DE 3633335 and DE 3712814 all disclose flange ring seals using metal and elastomeric parts. These seals generally comprise a metal insert in the elastomeric material. While this design provides a seal with improved rigidity, the seal against the flange is made by the elastomer, which has the inherent disadvantage of seal degradation.

In packers, it is known to position an elastomeric sleeve around a tubing, the sleeve being limited by upper and lower retainers. In order to provide an annular seal and/or anchor the tubing in a well bore, one or both of the retainers are moved toward the other. This results in compression of the sleeve so that it deforms radially outwardly to fill the space between the tubing and a bore hole wall or tubular and adhere to the bore hole wall or tubular. Various arrangements have been provided in an attempt to ensure a sufficient portion of the sleeve contacts the borehole or tubular wall to effect a good seal while maintaining the sleeve within the retainers during compression. In addition, the surfaces of the seals have been modified to improve adhesion to the borehole wall. Further, metal to metal seals as described above, have been incorporated.

WO 02/04783 to Moyes discloses a deformable member comprising a generally hollow cylindrical body defining a wall, the wall includes three circumferential lines of weakness in the form of grooves, with two grooves provided in an outer surface of the member wall, and the other groove provided in an inner surface. The member is deformed outwardly to provide a seal, by folding about the lines of weakness. The member is typically made of a tough malleable material such as carbon steel. A disadvantage of this seal is that by introducing lines of weakness to help the seal deform, the whole structure is weakened. As a result thick sections are required to prevent the element from collapsing under pressure differentials.

U.S. Pat. No. 5,988,276 to Oneal discloses a compact retrievable well packer which also utilises deformable cylindrical members to form the annular seal and also to lock the well packer in situ. As with Moyes, thick sections are required to prevent the sealing element from collapsing under pressure differentials.

U.S. Pat. No. 5,961,123 to Ingram et al discloses a seal arrangement which is designed to prevent the seal from extruding uphole or downhole when subjected to extremes of differential pressure. In this arrangement the seal material is bounded at either end by metal back-up rings, these rings may be attached to the seal or, as disclosed in U.S. Pat. No. 5,961,123, be attached to one of the retainers. This seal has the typical disadvantages of elastomeric based seals which can be degraded easily by heat and chemicals used downhole.

U.S. Pat. No. 5,775,429 to Arizmendi et al discloses a seal including a deformable sheath having a body and first and second ends for defining an interior volume proximate to a tool surface. The tool surface is the tubing. A material located within the interior volume is deformable, when the sheath second end is moved toward the sheath first end. The sheath is typically a relatively thin walled tubular member formed from materials like stainless steel or titanium. The filler material within the interior volume plastically deforms to advantageously allow the seal to be used oval shaped bore holes. Unfortunately this seal does not perform well in practice. As the filler material is restrained by the tubing, volumetric changes in the seal distort the seal and reduce the effectiveness of contact with the bore hole wall or tubular. These volumetric changes occur as the sheath ends are brought together before the seal meets the bore hole wall or tubular and is pressurised.

It is an object of at least one embodiment of the present invention to provide a sealing element which is flexible, like an elastomer seal, but is fully metal to metal.

It is a further object of at least one embodiment of the present invention to provide a sealing element having a fully enclosed filler material to provide improved sealing properties of the element.

It is a yet further object of at least one embodiment of the present invention to provide a sealing element which deforms in a controlled manner on a cantilever principle.

SUMMARY

According to a first aspect of the present invention there is provided a sealing element for providing a seal between a first and a second surface, the element comprising an inner deformable surface, an outer deformable surface, the inner and outer surfaces being joined at opposed first and second ends, providing a body defining an interior volume entirely bounded by the said surfaces and said ends, a deformable filler material within said interior volume, wherein the element deforms in a predetermined manner to seal between the first and second surfaces when said ends are brought toward each other.

By entirely enclosing the deformable filler material within the element, the material acts as a filler within a continuous body. This allows the shape of the volume of the element to change as the ends are brought together but minimises any change in the said interior volume. By minimising any change in the interior volume until pressure is applied across the seal, the seal will deform in a predetermined manner. As discussed hereinbefore, as a disadvantage with respect to the seal of U.S. Pat. No. 5,775,429, delamination of the filler from the said surfaces will occur unless the volume change is minimised. This feature of the seal helps prevent the seal collapsing when pressure is applied across the seal, between the inner and outer surfaces.

Preferably, the inner and outer deformable surfaces are sleeves, the element thereby being annular. Such an arrangement can provide a seal around a mandrel or tubing. Alternatively the arrangement can provide an annular seal for a flange. Preferably the inner and outer surfaces are deformable metal sleeves. Preferably the inner and outer surfaces define a first shape containing the interior volume. Following deformation the inner and outer surface define a second shape. Preferably the second shape is a cantilever structure arranged longitudinally between the ends. Preferably the first and second shapes are predetermined. The first and second shapes may be annular having a polygonal shape in longitudinal cross-section. For purposes herein, the term "polygon" refers to a polygonal shape or a closed multi-sided shape, and is not necessary limited to a closed planar shape bounded by straight lines. Advantageously the polygon is symmetrical across the horizontal plane. In a first embodiment the polygon has ten sides. In a preferred embodiment the polygon has fifteen sides. The shape of the polygon, but not the number of sides, varies as the sealing element is deformed. Preferable the outer surface defines at least two peaks and at least one trough. Preferably also the inner surface defines at least two peaks and at least one trough. In a preferred embodiment the outer surface defines two peaks and one trough and the inner surface defines three peaks and two troughs.

Preferably the deformable filler material has a first volume. Advantageously the first volume equals the interior volume and both remain substantially equal as the ends are brought together. The deformable filler material may be an elastomer, plastic or other flexible material. Advantageously the filler material is a plastic. Use of a plastic is possible as the filler material will allow the seal to have a higher temperature rating than an elastomer, but being entirely encased in metal will not extrude as can be seen with elastomers and such plastics which have unsuitable mechanical properties.

Preferably the outer surface includes a plurality of outer ridges. The outer ridges bite into the second surface. This is advantageous when the second surface is a wall of the well bore, in a well which is open hole, or a tubing wall for a well which is cased. Preferably the outer ridges are arranged circumferentially around the outer surface. Advantageously a sealant material is applied to at least a portion of the outer surface. More preferably the portion is between the outer ridges. The sealant material may be Teflon® or the like. The sealant material provides a seal in the event that the primary metal seal of the outer surface fails to work.

Optionally at least one metal insert is located on at least a portion of the outer surface. More preferably the portion is between the outer ridges. Preferably the metal insert is a ductile inert metal. More preferably, the metal insert is gold. The metal insert could be the primary seal, instead of the deformable surfaces or the sealant material. The ductile insert could deform to accommodate any scratches or other discontinuities, which the outer surface may not.

According to a second aspect of the present invention there is provided a method of providing a seal between a first and a second surface, the method comprising the steps:
(a) providing a sealing element according to the first aspect, having a first interior volume and a first shape with a filler having a first volume substantially equal to the first interior volume;
(b) arranging the element adjacent the first surface and opposite the second surface;
(c) moving one or both ends of the sealing element toward the opposing end;
(d) deforming the sealing element in a controlled manner to provide a second shape while keeping the first interior volume and the first volume substantially equal;
(e) contacting the sealing element on the first and second surfaces to provide the seal; and
(f) further moving one or both ends of the sealing element toward the opposing end to provide a pressure across the sealing element between the inner and outer surfaces.

By keeping the volumes substantially equal, delamination of the filler material from the inner and outer surfaces is prevented. By avoiding delamination this helps prevent the sealing element collapsing when the pressure is applied across the sealing element in step (f).

Preferably, the sealing element forms a cantilever structure during deformation.

Preferably the method includes the step of deforming the outer and inner surfaces of the sealing element.

Preferably also the method includes the step of abutting ridges of the sealing element onto at least the second surface. Advantageously the step includes the ridges biting into the second surface.

Preferably the method further includes the step of abutting a sealing material of the sealing element to at least the second surface to improve the sealing characteristics.

Preferably the method further includes the step of abutting a metal insert of the sealing element to at least the second surface to improve the sealing characteristics.

According to a third aspect of the present invention there is provided apparatus for providing a seal between a first and a second surface within in a well bore, the apparatus comprising a substantially tubular body upon which is located the first surface; a sealing element located around the tubular body, comprising an inner deformable surface, an outer deformable surface, the inner and outer surfaces being joined at opposed first and second ends, providing a sealing body defining an interior volume entirely bounded by the said surfaces and said ends, a deformable filler material within said interior volume; at least one actuating element arranged around and longitudinally moveable relative to the body; the actuating element including means for affixing an end of the sealing element; wherein the sealing element deforms in a predetermined manner to seal between the first and second surfaces when said ends are brought toward each other by movement of the actuating element.

Preferably the apparatus comprises a packer or other downhole tool. More preferably the apparatus comprises a retrievable packer. Alternatively the apparatus comprises an expansion joint or other travelling seal.

Preferably the at least one actuating element is a cone. The cone has a bore therethough for passage of the sealing body. Preferably there are two cones, one located at each end of the sealing element. Preferably also at least one cone is releasably retained to the tubular body. The cone may be retained by shear pins.

Alternatively the at least one actuating element is a threaded ring. By tightening the ring against an end, the sealing element is pre-loaded.

Preferably, the inner and outer deformable surfaces are sleeves, the element thereby being annular. Such an arrangement provides a seal around a mandrel or tubing. Preferably the inner and outer surfaces are deformable metal sleeves. Preferably the inner and outer surfaces define a first shape containing the interior volume.

Following deformation the inner and outer surface define a second shape. Preferably the second shape is a cantilever structure arranged longitudinally between the ends. Preferably the first and second shapes are predetermined. The first and second shapes may be annular having a polygon in longitudinal cross-section. Advantageously the polygon is symmetrical on the across the horizontal plane. In a first embodiment the polygon has ten sides. In a preferred embodiment the polygon has fifteen sides. The shape of the polygon, but not the number of sides, varies as the sealing element is deformed. Preferable the outer surface defines at least two peaks and at least one trough. Preferably also the inner surface defines at least two peaks and at least one trough. In a preferred embodiment the outer surface defines two peaks and one trough and the inner surface defines three peaks and two troughs.

Preferably the deformable filler material has a first volume. Advantageously the first volume equals the interior volume and both remain substantially equal as the ends are brought together. The deformable filler material may be an elastomer or a plastic. Advantageously the filler material is a plastic. Use of a plastic is possible as the filler material will not be affected by heat, being entirely encased in metal.

Preferably the outer surface includes a plurality of outer ridges. The outer ridges bite into the second surface in the well bore. The second surface may be a wall of the well bore, when the well is open hole, or tubing wall when the well is cased. Preferably the outer ridges are arranged circumferentially around the outer surface. Advantageously a sealant material is applied to at least a portion of the outer surface. More preferably the portion is between the outer ridges. The sealant material may be Teflon® or the like. The sealant material provides a seal in the event that the primary metal seal of the outer surface fails to work.

Optionally at least one metal insert is located on at least a portion of the outer surface. More preferably the portion is between the outer ridges. Preferably the metal insert is a ductile inert metal. More preferably, the metal insert is gold. The metal insert could be the primary seal, instead of the deformable surfaces or the sealant material. The ductile insert could deform to accommodate any scratches or other discontinuities, which the outer surface may not.

According to a fourth aspect of the present invention there is provided a method of anchoring an apparatus to an inner surface of a well bore, the method comprising the steps:

(a) providing an apparatus according to the third aspect, having a first interior volume and a first shape with a filler having a first volume substantially equal to the first interior volume;
(b) running the apparatus on a work string in the well bore;
(c) moving one or both ends of the sealing element toward the opposing end;
(d) deforming the sealing element in a controlled manner to provide a second shape while keeping the first interior volume and the first volume substantially equal;
(e) contacting the sealing element on the first and second surfaces; and
(f) further moving one or both ends of the sealing element toward the opposing end to provide a pressure across the sealing element between the inner and outer surfaces thereby anchoring the apparatus to the second surface.

Preferably, the sealing element forms a cantilever structure during deformation.

Preferably the method includes the step of deforming the outer and inner surfaces of the sealing element.

Preferably also the method includes the step of abutting ridges of the sealing element onto the second surface. Advantageously the step includes the ridges biting into the second surface.

Preferably the method further includes the step of abutting a sealing material of the sealing element to the second surface to improve the sealing characteristics.

According to a fifth aspect of the present invention there is provided a flange ring seal for location in a groove of a mating plate of a flange, the seal comprising an inner deformable surface, an outer deformable surface, the inner and outer surfaces being joined at opposed first and second ends, providing a sealing body defining an interior volume entirely bounded by the said surfaces and said ends, a deformable filler material within said interior volume; wherein an end is arranged to locate in the groove of the flange and wherein the seal deforms in a predetermined manner an opposing mating plate is brought against the mating plate to seal between the plates.

Preferably, the inner and outer deformable surfaces are sleeves, thus forming the ring. Preferably the inner and outer surfaces are deformable metal sleeves. Preferably the inner and outer surfaces define a first shape containing the interior volume. Following deformation the inner and outer surface define a second shape. Preferably the second shape is a cantilever structure arranged longitudinally between the ends. Preferably the first and second shapes are predetermined. The first and second shapes may be annular having a polygon in longitudinal cross-section. Advantageously the polygon is symmetrical on the across the horizontal plane. In a first embodiment the polygon has ten sides. In a preferred embodiment the polygon has fifteen sides. The shape of the polygon, but not the number of sides, varies as the sealing element is deformed. Preferable the outer surface defines at least two peaks and at least one trough. Preferably also the inner surface defines at least two peaks and at least one trough. In a preferred embodiment the outer surface defines two peaks and one trough and the inner surface defines three peaks and two troughs.

Preferably the deformable filler material has a first volume. Advantageously the first volume equals the interior volume and both remain substantially equal as the ends are brought together. The deformable filler material may be an elastomer or a plastic. Advantageously the filler material is a plastic. Use of a plastic is possible as the filler material will not be affected by heat, being entirely encased in metal.

BRIEF DESCRIPTION OF THE DRAWINGS

Embodiments of the present invention will now be described, by way of example only, with reference to the following drawings of which.

DESCRIPTION

Figures 1, 2:
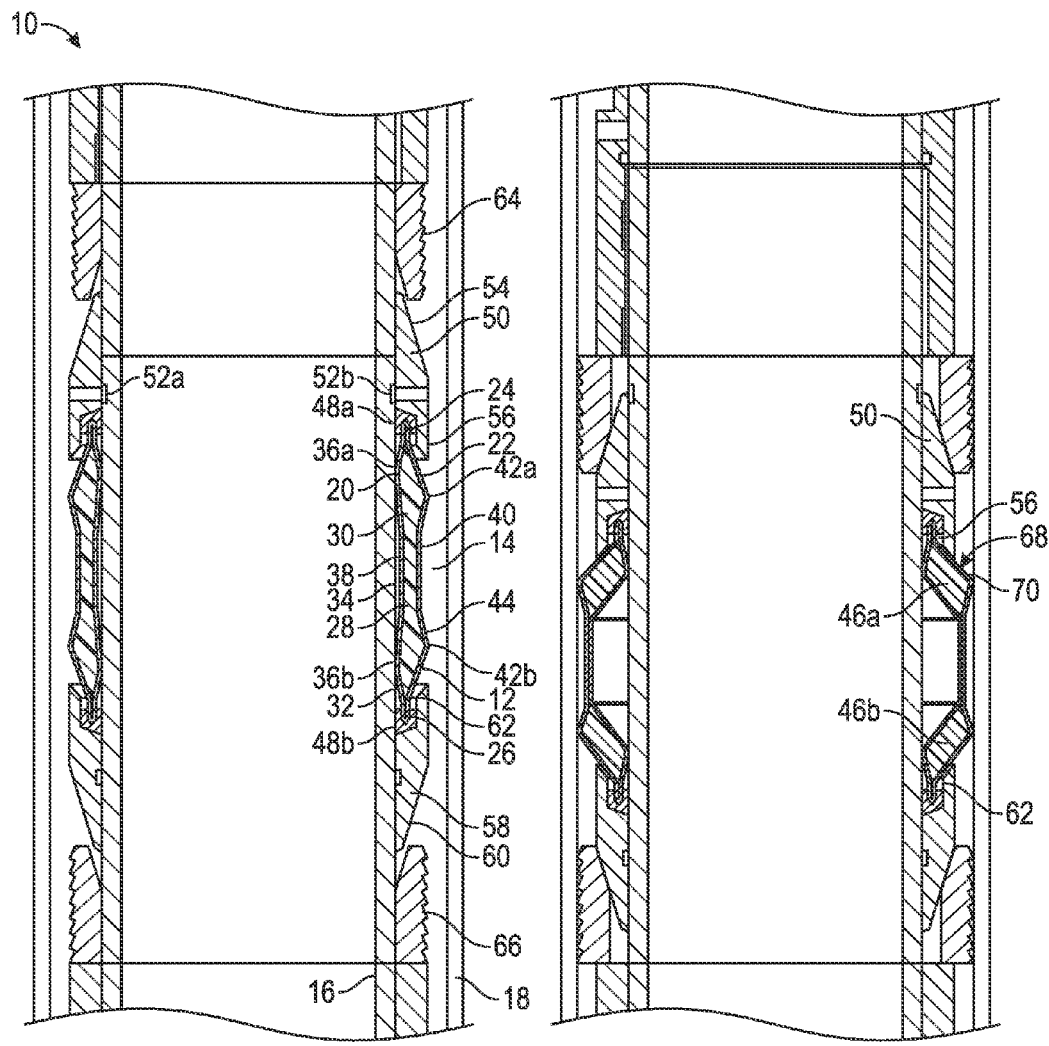
FIG. 1 is a cross-sectional view a packer tool incorporating a sealing element according to an embodiment of the present invention, with the element unset.
FIG. 2 is a cross-sectional view through the tool of FIG. 1, now shown in the set position.

Referring initially to FIG. 1, there is illustrated a downhole tool, generally indicated by reference numeral 10, according to an embodiment of the present invention. Downhole tool 10 is a packer, being an apparatus for providing a seal between a first and a second surface within in a well bore. Located on the tool 10, is a sealing element 12, according to an embodiment of the present invention. Tool 10 operates by filling the space 14 between the tool body 16 and a bore hole wall, such as a casing 18, to provide a seal between the tool 10 and the casing 18.

Sealing element 12 comprises a generally cylindrical sleeve which surrounds the tool body 16. Element 12 is formed as two concentric metal sleeves, an inner sleeve 20 and an outer sleeve 22. The sleeves are joined at upper 24 and lower 26 ends. Between the sleeves 20,22 is located a filler 28. The filler is entirely contained within the sealing element 12 and bounded on all sides by the metal sleeves 20,22. Thus an interior volume 30 defined by the metal sleeves 20,22 contains an equal volume of the filler 28.

The sleeves 20,22 are made of a deformable metal. The metal is typically stainless steel and the thickness of the sleeve 20,22 is selected to ensure that the steel is deformable under pressure. The sleeves are pinched together at the ends 24,26. The filler 28 is also of a deformable material. The filler may be a plastic or elastomer. However, as the filler 28 is entirely encased in metal, it is not affected by heat and thus a plastic, such as Teflon®, is preferable.

The inner sleeve 20 provides an inner surface 32 facing an outer surface 34 of the tool body 16. Inner surface 20 is geometrically arranged to provide two symmetrical peaks 36a,b running circumferentially around the surface 20. Peaks 36a,b rest on the surface 34 of the tool body 16. A trough 38 lies between the two peaks 36a,6. Trough 38 has symmetrical sloping side walls with a flat base lying parallel to the surface 34 of the tool body 16.

The outer sleeve 22 has a similar geometrical arrangement on its outer surface 40 to that of the inner surface 32. However peaks 42a,b are somewhat closer together providing a narrower trough 44. The bases of each trough 38,44 are approximately equal in length.

When viewed together in cross-section, the surfaces 32,40 provide a polygon having ten sides. Each side is substantially linear. The polygon is symmetrical on a plane perpendicular to the well bore. The geometrical arrangement of the sealing element 12 is selected so that when the ends 24,26 are brought together the element 12 will deform in a controlled manner. The peaks 36,42 and troughs 38,44 will act like fold lines on the sleeves 20,22 and the element 12 will form a cantilever structure, best seen in FIG. 2.

In FIG. 2, the ends 24,26 have been brought together by the longitudinal displacement of the end 24 towards the element 12. Trough 38 has been forced radially outwards and meets trough 44. With the sleeves 20,22 meeting, the filler material is contained in two chambers 46a,b. The peaks 36,42 are now more acute so that the element 12 bridges the space 40. It should be noted that the element 12 provides a cantilever structure which supports the seal 12 and allows the tool 10 to be anchored to the casing 18 by the slips 66. The filler 28 supports the seal 12 to prevent the seal from collapsing with pressure applied from the end 24. The interior volume 30 and the volume of the filler 28 remain substantially the same between the two positions, FIG. 1 and FIG. 2. The filler 28 has remained in contact with the continuous surface formed by the sleeves 20,22 and defining the interior volume 30. As delamination has not occurred, the filler 28 helps prevent the seal 12 collapsing when pressure is applied across the seal between the surfaces 32,40 when the seal 12 is in contact with the casing 18.

Returning to FIG. 1, sealing element 12 is mounted upon tool body 16. The ends 24,26 locate into opposed fixings 48a,b. The fixings 48a,b hold the sleeves 20,22 together to provide the interior volume 30 where the filler 28 is located. At the upper end 24 of the seal 12 is located an upper cone 50, which is formed as a sleeve having a sloping surface 54. Cone 50 fits over the tool body 16 and is held against the body by shear pins 52a,b. The cone 50 has an outer sloping section 54 and a lower lip 56. Lip 56 provides an overhang across the seal 12 and the seal 12 rests upon it. The lip 56 covers the fitting 48a, thereby protecting the end 24 of the seal during operation.

At the lower end 26 of the seal 12 is located a lower cone 58. Cone 58 includes a sloping surface 60 and a lip 62 in an identical manner to cone 50. Cone 58 is bolted to the tool body 16 so that it cannot move during operation of the tool 10. Located outside the cones 50,58 are slips 64,66 as are known in the art.

In use, tool 10 is mounted on a work string (not shown) and run into a well bore. The seal 12 is not set, as illustrated in FIG. 1, so that seal 12 lies toward the body 16 and a space 14 exists between the tool 10 and the casing 18 within the well bore. In this unset configuration the tool 10 can be run without interfering with any other operations performed in the well bore. When the tool 10 has reached a location within the well bore where an annular seal is required between the tool 10 and the casing, the tool 10 can be set. This is achieved by moving the cone 50 towards the lower sleeve 58. It will be appreciated by those skilled in the art that either or both cones 50,58 could be moved. It will also be known by those in the art that various actuation mechanisms such as weight-setting and hydraulic actuation can be used to cause movement of the cone 50. Shear pins 52a,b are sheared in the actuation to allow the cone 50 to move along the tool body 16. If cone 50 is the lower cone, then holding the cone in position will provide actuation by the relative movement of the work string and the tool 10 through the cone.

Effectively, cone 50 is moved towards sleeve 58. The compression applies pressure longitudinally onto the seal 12. The pressure causes the peaks 36,42 to move away from each other while the troughs 38,44 move toward each other. It is the geometrical arrangement of the peaks and troughs which cause the seal 12 to deform in this controlled manner. Deformation is complete when the troughs meet. This is illustrated in FIG. 2. During the deformation, the polygon has changed in shape, but the interior volume 30 and the volume of the filler 28 have remained substantially equal and constant throughout.

Continued pressure forces the outer peaks 42 against the casing 18 while the inner peaks meet the surface 34 of the tool body 16. A seal is thus formed between the tool 16 and the casing 18. Additionally the seal 12 now anchors the tool 10 against the casing 18 at this location. The seal 12 is set. The seal 12 provides a cantilever structure from the overhangs at lips 56,62. The filler 28 located now in the two chambers 46a,b supports the seal and prevents any collapsing as additional force is applied from the cone 50, and across the seal from the casing 18. Slips 64,66 have been forced up the slopes 54,60 to provide additional anchorage to the tool 10.

Sealing element 12 has ridges 68 located upon its outer surface 40. The ridges 68 bite into the casing 18 in order to effect the seal. A sealant material, Teflon®, is located between the ridges 68 to provide an improved seal if the primary metal seal of the ridges 68 fail. This is described with reference to FIG. 5.

The tool 10 can be retrieved from the well bore, by moving the ends 24,26 apart via movement of one or both of the cones 50,58. Separation of the ends 24,26 pulls the seal longitudinally and the seal 12 returns close to its original shape. A space 14 is thus created between the tool 10 and the casing 18 so that the work string can be pulled from the hole.

Figure 3:
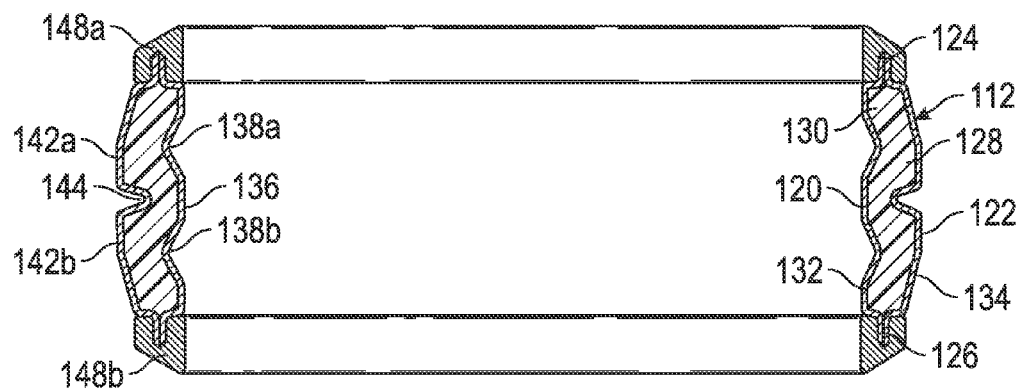
FIG. 3 is a cross-sectional view a packer tool incorporating a sealing element according to a further embodiment of the present invention, with the element unset.

Referring now to FIG. 3, there is illustrated a sealing element, generally indicated by reference numeral 112, according to a preferred embodiment of the present invention. Like parts to the sealing element 12 of FIGS. 1 and 2 have been given the same reference numeral with the addition of one hundred. Sealing element 112 operates in an identical manner to sealing element 12 in providing a seal between two surfaces. For ease of interpretation, ends are shown held in opposed fixings 148a,b as described hereinbefore with reference to FIGS. 1 and 2.

Sealing element 112 comprises a continuous cylindrical annulus which may be described as a torus. The element 112 is formed from two metal sleeves, a first 120 being arranged inside and coaxial with a second 122. The sleeves, 120,122 are joined at upper 124 and lower 126 ends by having adjacent sides of the sleeves meeting over a short distance. The ends 124,126 of the sleeves 120,122 are held together by the fixing elements 148a,b. A resultant interior volume 130 is created which is entirely bounded by the sleeves 120,122 and the ends 124,126. The interior volume 130 is completely filled with a filler 128. The filler 128 contacts the sleeves 120,122 and ends 124,126. Each sleeve 120, 122 is formed of a metal continuous metal strip. The metal is preformed into a shape calculated to deform in a predetermined manner when the ends 124,126 are brought together. The inner sleeve 120, in longitudinal cross-section, has a surface 132 which is symmetrically shaped through a horizontal plane equidistant from the ends 124,126. The surface 132 forms a series of peaks and troughs. There are two troughs 138a,b which comprise opposing sloping surfaces, bounding a single peak 136 which is a plateau bounded by the sloping surfaces of the troughs 138a,b. The outer sleeve 122 has a profile 134 in reverse to the inner sleeve 120 with respect to the element 112. There are not distinct peaks 142a,b, opposing the troughs 138a,b. These have been levelled to provide a sharp sloping surface into the trough 144 opposite the peak 138. Each surface 132,134 is made up of a series of straight sections so that the metal of the sleeve can be bent along fold lines to create the shape required. In longitudinal cross-section through the torus, a polygon is created which defines the interior volume 30 and the volume of filler 128.

By mirroring the profiles of the sleeves 120,122, when the ends 124,126 are brought together the interior volume 130 remains substantially constant while the shape of the sleeves 120,122 i.e. the polygon, deforms in a manner to accentuate the peaks and troughs. As the interior volume 130 remains substantially constant the filler 128 will deform with the element 112, but will remain in contact with the entire inside surface of the sleeves 120,122 at all times. In this way delamination is prevented which would otherwise cause air pockets in the seal, weakening its ability to withstand both longitudinal pressure applied from the ends 124,126 and transverse pressure applied horizontally between the sleeves 120,122.

Figure 4:
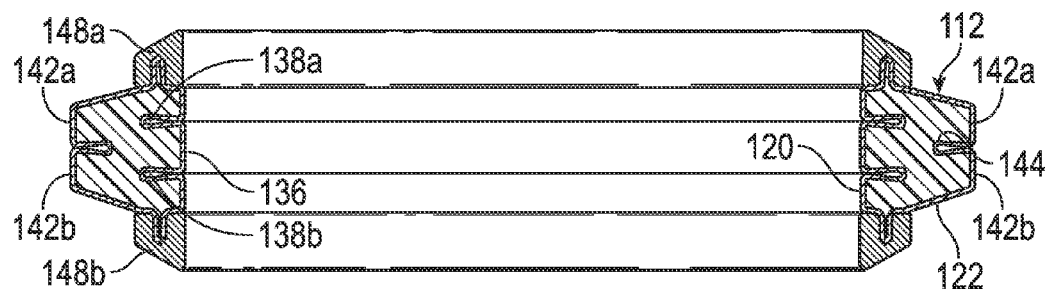
FIG. 4 is a cross-sectional view through the tool of FIG. 4, now shown in the set position.

Reference is now made to FIG. 4 of the drawings which illustrates the seal 112 of FIG. 3 when the ends 124,126 have been brought toward each other. This represents the seal 112 in the 'set' position. Like parts to those of FIG. 3 have been given the same reference numeral to aid clarity. It can be seen that the peaks 142a,b now sit proud of the fixing elements 148a,b. As the peaks 136,138,142 are plateau like, they provide planar surfaces to improve the sealing properties of the element 112. The area of contact of the sealing element 112 is thus predetermined by the dimension of the peaks 136,138, 142 in the shape of the original sleeves 120,122. Further the arrangement of opposing peaks and troughs, with a trough 144/peak 136 on the horizontal plane bounded by symmetrically arranged peaks 142 and troughs 138, provides a cantilever structure which strengthens the sealing element 112.

As described herein with reference to FIGS. 1 and 2 the peaks 142a,b on the outer sleeve 122 may include ridges or other material to improve the grip of the sealing element 112 when these positions contact a surface within a well bore. Such additional features are illustrated with reference to FIG. 5.

Figure 5:
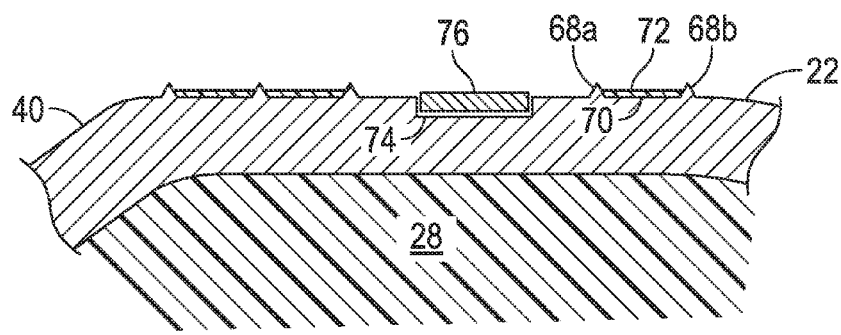
FIG. 5 is a part cross-sectional view of a portion of the outer surface of a sealing element according to a further embodiment of the present invention.

FIG. 5 shows a part cross-sectional view through the outer sleeve 22 of a sealing element 12. Like parts to those of FIGS. 1 and 2 have been given the same reference numeral to aid clarity. Outer surface 40 of the sleeve 22 has a number of ridges 68a,b located thereon. The ridges 68 are protrusions extending from the surface. While they are illustrated as triangular in cross-section, it will be understood that a variety of forms could be used as long as they provide a 'bite' for the seal 12 against the second surface (not shown).

Located between the ridges 68a,b on a portion 70 of the surface is a sealant material 72. The material 72 can be a coating or may be a treatment applied to the surface 70. The coating could be metal, plastic or another material which will conform to the second surface on contact. While the material 72 is shown as only located between the ridges 68 it will be understood that the ridges could additionally or independently be coated. Teflon® or the like would be a suitable material 72.

A further feature of the surface 40 is in the provision of a groove 74 for an insert 76. At discrete locations over the surface 40, grooves 74 in the form of indents can be arranged. Into each groove 74 an insert 76 is fitted. It will be appreciated that any suitable technique may be used for attaching the insert 76 to the groove 74. The insert 76 is a metal, which is preferably a ductile, inert metal, such as gold. In use, the insert 76 would be the primary seal, instead of the outer surface 40 or the sealant material 72. The ductile insert 76 will deform to accommodate any scratches or other discontinuities, which the outer surface 40 may not.

Figure 6:
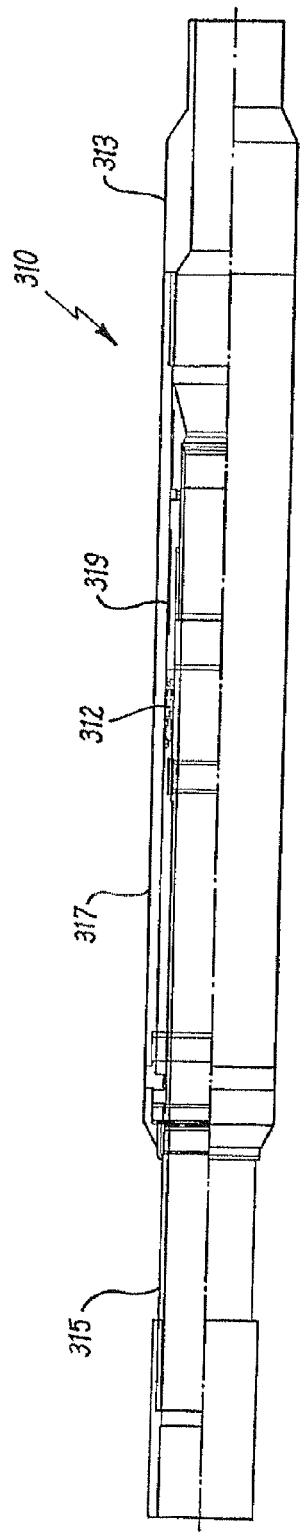
FIG. 6 is a part cross-sectional view of an expansion joint incorporating a sealing element according to a further embodiment of the present invention.

A further example application of use of the sealing element of the present invention is in an expansion joint. FIG. 6 illustrates an expansion joint, generally indicated by reference numeral 310, as may be found in a tool string run in a well bore. The joint 310 operates by allowing one portion, such as a sleeve 313 to move axially relative to the mandrel 315. A seal 312 is located between the moving parts with a pressure differential between the outside and the tubing string. The seal 312 is as described hereinbefore with reference to FIGS. 1-4. The seal 312 is held on a mandrel 315, within a seal bore 317. Alternatively, the seal could be held on a housing, with a moveable mandrel. The seal 312 is activated by applying a pre-load to deform it slightly. A threaded ring 319 is used to apply the pre-load, but other methods could be equally be used. The surface of the seal bore 317 is treated in such a manner that friction and wear are minimised. This could be done with tungsten carbide coating or other such methods, which are well understood. In use, the seal 312 slides within the seal bore 317, maintaining a dynamic seal during axial movement of the mandrel 315 within the stationary seal bore 317.

Figure 7A:
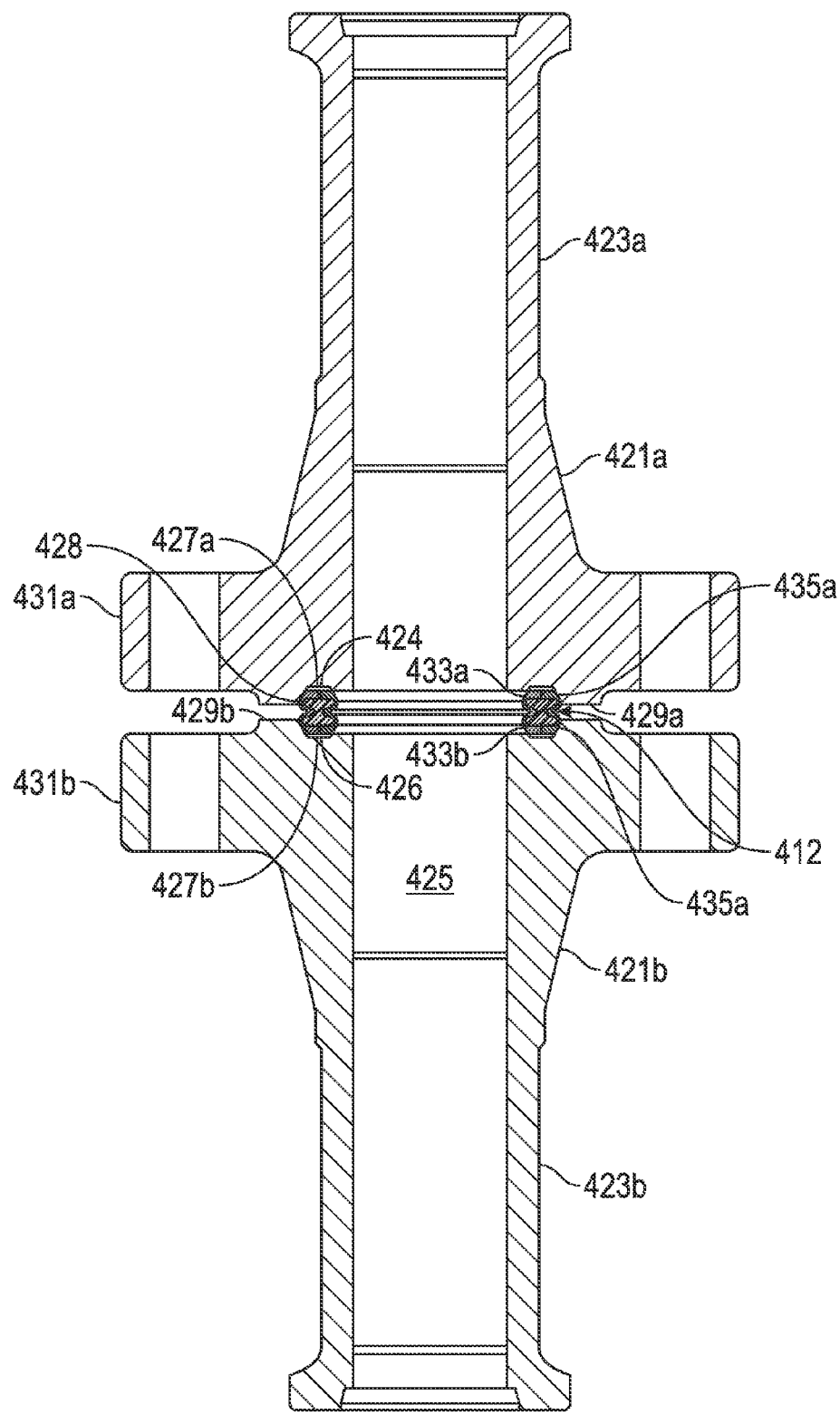
FIG. 7(a) is a schematic cross-sectional view through mating flanges incorporating a sealing element, shown in detail in FIG. 7(b), according to a further embodiment of the present invention.
Figure 7B:
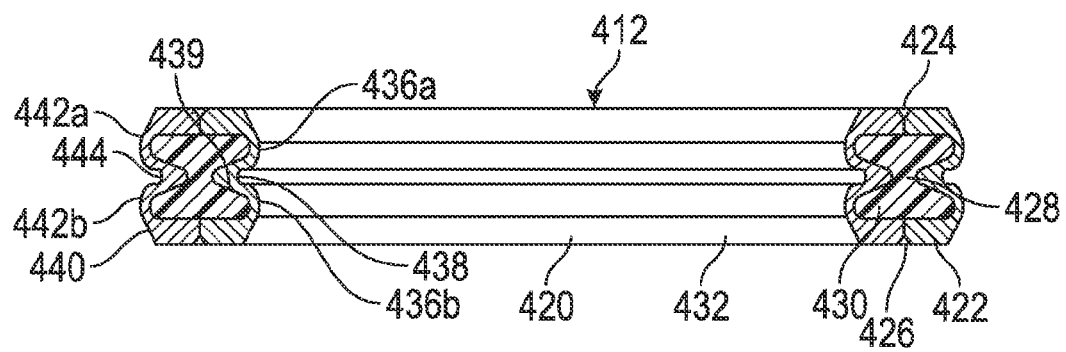

Reference is now made to FIGS. 7(a) and 7(b), illustrating a sealing element, generally indicated by reference numeral 412, being used as a flange sealing ring. When flanges 421a,b are brought together to join adjacent pipe sections 423a,b, a seal is needed to prevent the escape of fluid from the pipe bore 425. Each flange 421a,b includes a circular groove 427a,b located on the surface 429a,b of the flange plate 431a,b. The seal 412 is sized to locate within the grooves 427a,b. Indeed the grooves 427a,b are profiled to match the outer surface of the ends 424,426 of the seal 412. Sealing between the flanges 421a,b is achieved at the first surface, being a combination of the inner edges 433a,b of the grooves 427a,b respectively, and the second surface, being a combination of the outer edges 435a,b of the grooves 427a,b respectively.

Sealing element 412 is as described with reference to FIGS. 1-4, comprising an annular body. Element 412 is formed as two concentric metal sleeves, an inner sleeve 420 and an outer sleeve 422. The sleeves are joined at upper 424 and lower 426 ends. Joining is by welding of the sleeves 420,422. Between the sleeves 420,422 is located a filler 428. The filler is entirely contained within the sealing element 412 and bounded on all sides by the metal sleeves 420,422. Thus an interior volume 430 defined by the metal sleeves 420,422 contains an equal volume of the filler 428.

Inner sleeve 420 is geometrically arranged to provide two symmetrical peaks 436a,b running circumferentially around the surface 432. A trough 438 lies between the two peaks 436a,6. Trough 438 has symmetrical sloping side walls with a flat base 439. The outer sleeve 422 has a similar geometrical arrangement on its outer surface 440 to that of the inner surface 432. However peaks 442a,b are somewhat closer together providing a narrower trough 444 without a flat base.

As is seen in FIGS. 7(a) and (b) geometrical arrangement of the sealing element 412 is selected so that when the ends 424,426 are brought together the element 412 will deforms in a controlled manner. The peaks 436,442 and troughs 438,444 act like fold lines on the sleeves 420,422 forming a cantilever structure, which supports the seal. The filler 428 supports the seal 412 to prevent the seal from collapsing with pressure applied from the ends 424. The interior volume 430 and the volume of the filler 428 remain the same during compression of the seal 412. The filler 428 remains in contact with the continuous surface formed by the sleeves 420,422. Delamination does not occur, thus the filler 428 helps prevent the seal 412 collapsing when pressure is applied across the seal.

The principal advantage of the present invention is that by entirely enclosing a filler material within two sleeves, volumetric changes in the sealing element are minimised and the seal will deform in a controlled manner.

A further advantage of an embodiment of the present invention is that it provides a sealing element, which by forming a cantilever structure on deforming, produces a strong seal which can be used to anchor tools in a well bore.

A yet further advantage of an embodiment of the present invention is that it provides a sealing element which does not collapse under pressure differentials. This is done without the need to thicken the sleeves as it is achieved by the 'rubber pressure' of the filler within the sealing element.

A still further advantage of an embodiment of the present invention is that it provides a sealing element which does not use elastomers, thus heat and chemicals typically found in well bores will not affect the operation of the seal.

A still further advantage of an embodiment of the present invention is that it provides a sealing element which has the benefits of flexibility, like an elastomer seal, but is fully metal-to metal.

A yet further advantage of at least one embodiment of the present invention is that it provides a sealing element which can be used in dynamic applications where it must slide while maintaining a seal.

It will be appreciated by those in the art that various modifications may be made to the invention hereindescribed without departing from the scope thereof. For example, the overall size of the sealing element can be varied to suit the tool used. The applications describe use in a packer, joint and flange mating but the sealing element could equally be applied to a range of subsea/downhole tools and equipment where a seal and/or anchoring is required.

We claim:

1. A flange ring seal assembly, comprising:
an annular sealing element providing a seal between a first mating plate of a first flange and a second mating plate of a second flange, comprising an inner sleeve providing an inner deformable surface and arranged concentric with an outer sleeve providing an outer deformable surface, each of the inner and outer sleeves being formed of a material liable to plastic deformation, the inner and outer sleeves being joined at respective junctions of opposed first ends and second ends providing a body defining an interior volume entirely bounded by said inner and outer deformable surfaces and said first and second ends, and a deformable filler material within said interior volume;
wherein the filler material is a plastic;
wherein the inner and outer sleeves each comprise a plurality of fold lines;
wherein the element deforms in a predetermined manner when said first ends are brought toward said second ends by deformation of the inner and outer sleeves about their respective fold lines, to thereby seal between the first mating plate and the second mating plate;
wherein the inner and outer sleeves define a first shape containing said interior volume, and following deformation the inner and outer sleeves define a second shape, which is a cantilever structure arranged longitudinally between the ends;
wherein the first and second shape are annular and are polygonal in longitudinal cross-section; and
wherein the first end is arranged to locate in a groove of the first mating plate of the first flange.

2. The flange ring seal assembly as claimed in claim 1 wherein the inner and outer sleeves are deformable metal sleeves.

3. The flange ring seal assembly as claimed in claim 1 wherein the polygonal longitudinal cross section of the first and second shapes are each-symmetrical about a horizontal plane, equidistant from the ends.

4. The flange ring seal assembly as claimed in claim 1 wherein the deformable filler material has a first volume which equals the interior volume and both remain substantially equal as the ends are brought together.

5. The flange ring seal assembly as claimed in claim 1, wherein the outer deformable surface includes a plurality of outer ridges.

6. The flange ring seal assembly as claimed in claim 1, further comprising a sealant material applied to at least a portion of the outer deformable surface.

7. The flange ring seal assembly as claimed in claim 1, further comprising at least one metal insert located on at least a portion of the outer deformable surface.

8. A method of anchoring an apparatus to an inner surface of a well bore comprising:
  (a) providing the apparatus having a substantially tubular body and comprising an annular sealing element having a first shape and located around the tubular body, the sealing element comprising an inner sleeve providing an inner deformable surface and arranged concentric with an outer sleeve providing an outer deformable surface, each of the inner and outer sleeves being formed of a material liable to plastic deformation, the inner and outer sleeves being joined at respective junctions of opposed first ends and second ends providing a body defining an interior volume entirely bounded by said inner and outer deformable surfaces and said first and second ends, and a deformable filler material within said interior volume;
  the filler material having a volume substantially equal to the interior volume;
  wherein the filler material is a plastic;
  wherein the inner and outer sleeves each comprise a plurality of fold lines;
  wherein the element deforms in a predetermined manner when said first ends are brought toward said second ends by deformation of the inner and outer sleeves about their respective fold lines;
  wherein the inner and outer sleeves define a first shape containing said interior volume, and following deformation the inner and outer sleeves define a second shape, which is a cantilever structure arranged longitudinally between the ends;
  wherein the first and second shapes are annular and are polygonal in longitudinal cross-section;
  at least one actuating element arranged around and longitudinally moveable relative to the tubular body the actuating element arranged to contact at least one of said first and second ends of the sealing element;
  (b) running the apparatus on a working string into the well bore; and
  (c) moving the actuating element to bring said first and second ends of the sealing element toward each other thereby deforming the sealing element in a controlled manner to provide the second shape in contact with the tubular body and the inner surface of the wellbore while keeping the interior volume and the volume of the filler material substantially equal to provide a pressure across the sealing element between the tubular body and the inner surface of the wellbore thereby anchoring the apparatus to the inner surface of the wellbore.

9. The method as claimed in claim 8, wherein the sealing element further comprises one or more ridges disposed on one or more of the inner and outer deformable surfaces, and wherein the method includes abutting one or more of the ridges of the sealing element onto at least the inner surface of the wellbore.

10. The method as claimed in claim 8 wherein the sealing element further comprises a sealing material disposed on one or more of the inner and outer deformable surfaces, and wherein the method includes abutting the sealing material of the sealing element to at least the-inner surface of the wellbore.

11. The method as claimed in claim 8 wherein the sealing element further comprises a metal insert disposed on one or more of the inner and outer deformable surfaces, and wherein the method includes abutting the metal insert of the sealing element to at least the inner surface of the wellbore.

12. A method of providing a seal between a first mating plate of a first flange and a second mating plate of a second flange comprising:
  (a) providing an annular sealing element comprising an inner sleeve providing an inner deformable surface and arranged concentric with an outer sleeve providing an outer deformable surface, each of the inner and outer sleeves being formed of a material liable to plastic deformation, the inner and outer sleeves being joined at respective junctions of opposed first ends and second ends providing a body defining an interior volume entirely bounded by said inner and outer deformable surfaces and said first and second ends, and a deformable filler material within said interior volume; the filler material having a volume substantially equal to the interior volume;
  wherein the filler material is a plastic;
  wherein the inner and outer sleeves each comprise a plurality of fold lines;
  wherein the element deforms in a predetermined manner when said first ends are brought toward said second ends by deformation of the inner and outer sleeves about their respective fold lines,
  wherein the inner and outer sleeves define a first shape containing said interior volume, and following deformation the inner and outer sleeves define a second shape, which is a cantilever structure arranged longitudinally between the ends;
  wherein the first and second shapes are annular and are polygonal in longitudinal cross-section;
  (b) arranging the sealing element between the first mating plate and the second mating plate;
  (c) moving the first mating plate and/or the second mating plate to bring said first end and said second end of the sealing element toward each other thereby deforming the sealing element in a controlled manner to provide the second shape in contact with the first mating plate and the second mating plate while keeping the interior volume and the volume of the filler material substantially equal to provide a pressure across the sealing element between the first mating plate and the second mating plate thereby providing a seal between the first mating plate and the second mating plate.

13. The method of claim 12, wherein the first mating plate of the first flange comprises an annular groove disposed therein;
  wherein said first end of the sealing element is arranged to locate in the groove of the first mating plate of the first flange, and wherein said arranging the sealing element between the first mating plate and the second mating plate includes locating said first end of the sealing element into the groove of the first mating plate.

14. The method of claim 13, wherein the second mating plate of the second flange comprises an annular groove disposed therein;
  wherein said second end of the sealing element is arranged to locate in the groove of the second mating plate of the second flange, and wherein said arranging the sealing element between the first mating plate and the second mating plate includes locating said second end of the sealing element into the groove of the second mating plate.

* * * * *